United States Patent
Horbelt et al.

(10) Patent No.: US 6,754,565 B2
(45) Date of Patent: Jun. 22, 2004

(54) DEVICE FOR IMPLEMENTING CONTROL OR REGULATING FUNCTIONS AND A METHOD OF CONTROLLING OR REGULATING IN A VEHICLE

(75) Inventors: Michael Horbelt, Markgroeningen (DE); Andre Owerfeldt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,764

(22) PCT Filed: Jan. 31, 2001

(86) PCT No.: PCT/DE01/00363

§ 371 (c)(1),
(2), (4) Date: Oct. 17, 2002

(87) PCT Pub. No.: WO01/62550

PCT Pub. Date: Aug. 30, 2001

(65) Prior Publication Data

US 2003/0105557 A1 Jun. 5, 2003

(30) Foreign Application Priority Data

Feb. 23, 2002 (DE) .......................................... 100 08 455

(51) Int. Cl.[7] ................................................. B60L 1/02
(52) U.S. Cl. ........................... 701/1; 700/300; 219/203; 219/528; 219/624
(58) Field of Search ................................. 701/1, 33, 35; 219/543, 480, 203, 209, 219, 548, 624, 645, 528; 700/300; 343/713; 320/135, 164; 338/314, 307; 303/111; 280/730.2, 728.3

(56) References Cited

U.S. PATENT DOCUMENTS

| | | | |
|---|---|---|---|
| 5,255,962 A | 10/1993 | Neuhaus et al. | 303/111 |
| 5,424,586 A | 6/1995 | Hattori et al. | 307/10.1 |
| 5,990,573 A | 11/1999 | Granitz et al. | 307/10.1 |
| 6,114,674 A * | 9/2000 | Baugh et al. | 219/543 |
| 6,246,507 B1 * | 6/2001 | Bauer et al. | 359/267 |
| 6,314,807 B1 * | 11/2001 | Kawai et al. | 73/204.26 |
| 6,357,294 B1 * | 3/2002 | Nakada | 73/204.26 |
| 6,559,426 B2 * | 5/2003 | Jirmann | 219/480 |
| 6,570,753 B2 * | 5/2003 | Bensaoula et al. | 361/311 |
| 6,593,591 B2 * | 7/2003 | Yudasaka et al. | 257/57 |

FOREIGN PATENT DOCUMENTS

| | | |
|---|---|---|
| DE | 37 38 915 | 5/1989 |
| EP | 0 890 485 | 1/1999 |

* cited by examiner

*Primary Examiner*—Thomas G. Black
*Assistant Examiner*—Tuan C To
(74) *Attorney, Agent, or Firm*—Kenyon & Kenyon

(57) ABSTRACT

A device for implementing control or regulating functions in a motor vehicle having at least one control unit, at least one peripheral element, and at least one control module. The peripheral element is connected to the control unit and receives and/or sends signals, and the control or regulating functions are implemented by a triggering and/or analysis of the signals of the peripheral element. The device also includes at least one control module connected between the control unit and the peripheral element, the control module being composed of an electronic unit and a flexible extension, and the peripheral element being contacted to the flexible extension.

14 Claims, 7 Drawing Sheets

DEVICE FOR IMPLEMENTING CONTROL OR REGULATING FUNCTIONS AND A METHOD OF CONTROLLING OR REGULATING IN A VEHICLE

FIELD OF THE INVENTION

The present invention relates to a device for implementing control or regulating functions and a method of controlling or regulating in combination with a motor vehicle.

BACKGROUND INFORMATION

In regulating or control functions in a vehicle, various functions are typically implemented by different devices, each having control units adapted individually to the given functions. Examples include devices controlling the running gear functions for anti-lock brake systems, traction control, electronic stability programs, or other systems which influence wheel speed and in particular increase driving stability and/or safety, as well as drive control or transmission control systems. Different control devices, such as a brake control device, engine control device, or transmission control device, are used, depending on the respective application, often connected by an internal communication system within the vehicle, in particular a bus system such as CAN or TTP/C. In addition, there are also functions in a vehicle necessitating the use of multiple comparable control devices, i.e., having a similar hardware design. This is true, for example, of lock systems or the control of actuator motors such as those used for window lift motors or in adjusting outside rearview mirrors, where the functions and thus also the comparable control devices must be implemented multiple times, e.g., according to the number of vehicle doors. In general, for reasons of cost and complexity, an attempt is made to use standard control devices, i.e., universally usable control devices which may be used for different functions. This means that although the functionality varies, e.g., in the case of a lock system, taking into account the passenger door to the driver's door and the front doors to the rear doors, an attempt is made to use one and the same standard control device for each individual door for reasons of simplicity or at least to minimize the variety of models of control devices and/or control units as much as possible, because otherwise up to three different control units would have to be used with such a lock system.

German Patent No. DE 37 38 915 describes a universal control device for regulating systems. A universal control device that determines the system design and stores it on the basis of an external command only after installation is used. However, such a universal control device must also have a variety of variant-determining components, i.e., specially designed circuit parts and/or components and individualized interfaces via which corresponding sensors or actuators may interact with the control device at the same time in order to ensure a large number of control and/or regulating functions, in particular different control and/or regulating functions.

Integration of such variant-determining circuit parts and interfaces for the desired control functions into one control device has proven to be relatively complicated and cost intensive. The need for such a universal control device to fulfill a variety of different control or regulating functions has a negative effect on the complexity of the control unit due to the variant-determining circuit parts and interfaces which must be present concurrently. With regard to the space required, such a universal control unit will also be larger than a control device variant tailored specifically to the respective regulation or control function.

Conventionally, several electronic control devices having the same hardware design are used in a vehicle. The specific function of these control devices, which communicate via a bus, is impressed upon them from the outside, depending on their specific application. Here again, variant-determining circuit parts and interfaces corresponding to the universal control device must be present in each control device for implementation of the possible or desired preselectable regulation or control functions.

SUMMARY

Conventional solutions do not yield optimum results. Thus, in accordance with an example embodiment of the present invention, a wide variety of different control and regulating functions may be implemented, while optimizing cost and complexity aspects.

According to an example embodiment of the present invention, a device for implementing control and/or regulating functions in a motor vehicle is provided, having at least one control unit and at least one peripheral element, the peripheral element being connected to the control unit and receiving and/or sending signals, and the control or regulating functions being implemented by triggering and/or analyzing the signals of the peripheral elements. The device contains at least one control module which may be connected between the control unit and the peripheral element and may be composed of an electronic unit and a flexible extension, and the peripheral element may be contacted to the flexible extension. In this way, the specific variant-determining control or regulation electronic systems may be used expediently, based on the on-site controlled system, so that the peripheral elements, i.e., in particular actuators and sensors, may be positioned very flexibly and appropriately with respect to the controlled system.

A film extension, for example, a film conductor, may be used as a flexible extension. Printed conductors or conductor structures for power and/or signal transmission to and/or from the peripheral elements may be encased in a nonconducting flexible material, in particular a moldable material such as plastic. It is advantageous that in addition to the flexible positioning of the control modules and/or the peripheral elements, problems such as unfavorable ambient influences for the conductor structures and/or the signal and/or power lines may also be largely ruled out. In addition, in view of problems involving electromagnetic compatibility, the conductor structures and/or the flexible extension may advantageously also be shielded with respect to such interference, and/or the transmission of their own interfering radiation by the control module, i.e., the flexible extension and/or components placed thereon, in particular over the conductor structures may be suppressed or prevented.

Use of a uniform, standardized interface between the flexible extension, in particular the conductor film and the electronic unit may allow different electronic units having flexible extensions of any desired design may be combined to form control modules.

Electronic components may be installed on the flexible extension and controlled there or analyzed to advantage. In this way, it is possible to produce an optimum contact or an optimum working relationship, e.g., between sensors and the elements to be sensed. Components for controlling actuators, in particular power components, may also be mounted on the flexible extension to advantage in such a way that they migrate physically to the actuators and thus interfering radiation and/or power loss due to a high-power signal may be prevented or diminished through radiation of the conductor structure.

The electronic unit may be designed to be scalable, i.e., composed of predefinable uniform components or combinations of components and circuit parts, so that the variants of the electronic units and thus the control modules may be limited according to a modular principle. A wide variety of different functionalities for control or regulation of operating sequences or processes in a vehicle may be implemented expediently through combined use of several mutually supplementary control modules or electronic units so that nevertheless any missing functionality may be achieved by installing appropriate components on the flexible extension.

Finally, the device and the method of control or regulation of operating sequences of a motor vehicle is an advantageous embodiment of the present invention, where the control or regulation may be implemented by at least one control unit, and the control unit contains programs and/or data for controlling and/or regulating certain first operating sequences, at least one peripheral element being connected to the control unit and receiving data in the form of signals therefrom or sending them thereto. The respective peripheral element may be advantageously used to control or regulate second operating sequences, and before reception and/or after transmission, the signals are processed in a control module, which is connected between the control unit and the peripheral element. The processing of the signals by the control module may be used to supplement the electronic components and/or functions required for the control or regulation of the second processes or operating sequences, when these electronic components and/or functions are missing in the control unit and/or peripheral element for controlling or regulating the second processes or they may not be used for that purpose, because they are available to the first processes, for example, the control or regulation of the first processes being implemented in addition to and independently of the control or regulation of the second processes. Thus, a control unit which is actually used for first processes and is already present for that purpose may also be simply used to advantage additionally if it still has capacity for the programs and/or data of the second processes, which are not being executed in the control module having a simple design. Thus, other possibilities for establishing contact may also be used expediently in addition to or instead of the interfacing of peripheral elements via flexible extensions.

Simple product care may be possible according to the present invention, because faulty or outdated control modules, i.e., control units, may be replaced easily and in an uncomplicated manner by control modules that are adequate for the function or that belong to a new generation.

The present invention is explained in greater detail below on the basis of the figures contained in the drawings.

DETAILED DESCRIPTION

Figure 1:
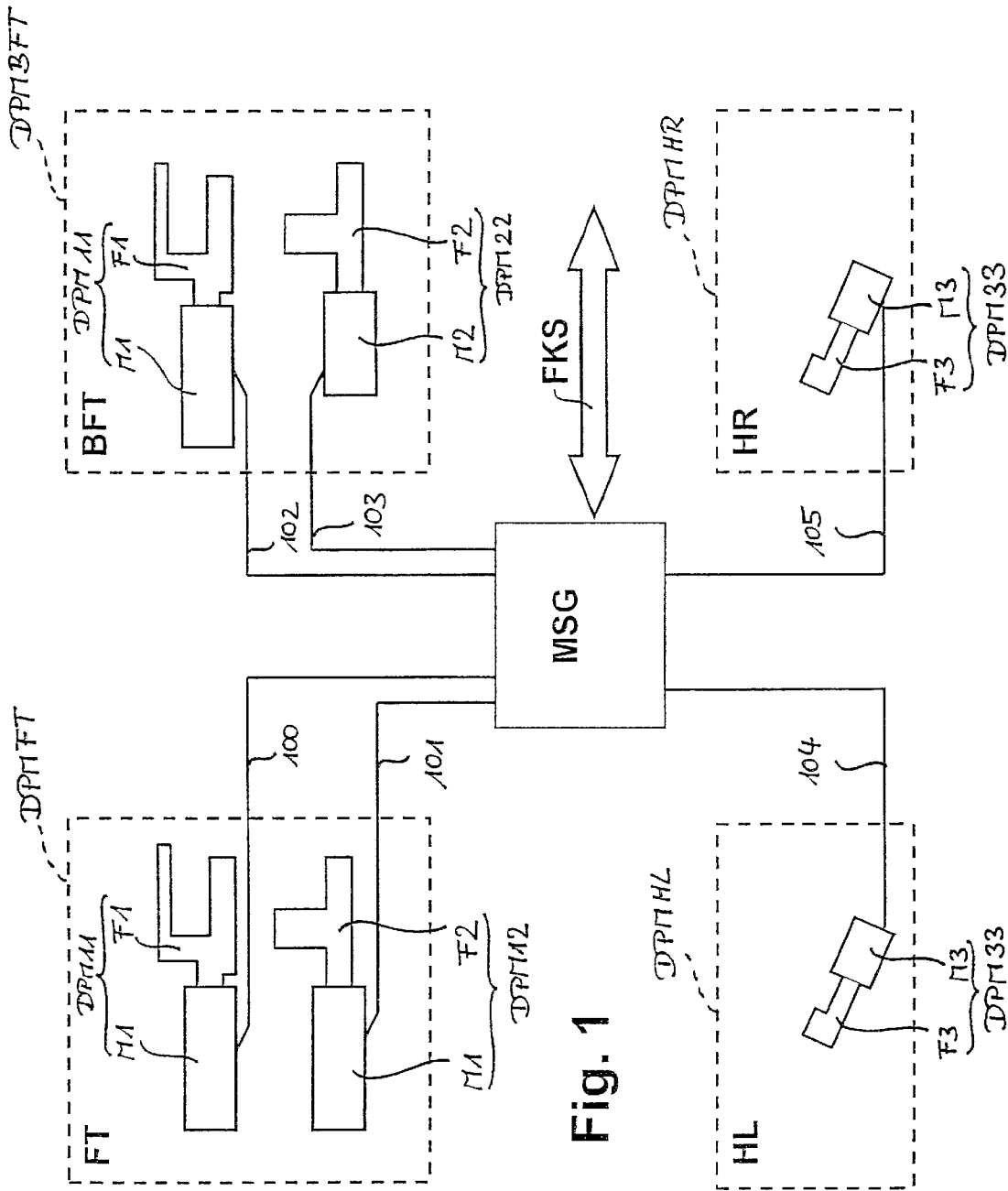
FIG. 1 shows a central control unit as a master having control modules connected to it by bidirectional interfaces.

FIG. 1 shows an example embodiment according to the present invention for dividing the functionality into a basic control device or central control unit, master control device MSG, e.g., a comfort control device for a lock system, automatic window lifts and/or mirror adjusters as well as intelligent control modules, also known as distribution and power modules DPM on site, e.g., in the vehicle doors. Master control device MSG may be connected, for example, to an automotive communication system FKS, in particular a bus system such as CAN or TTP/C, which is already present in the vehicle.

This control unit MSG may also be a control device which is already present in the vehicle, e.g., for engine and/or transmission control or the like, and has a gateway to this automotive communication system FKS via its interface with the vehicle communication system, in particular a field bus system based on a two-wire line and contains or receives the stored operating system and the other software, in particular the control or regulating algorithms, for controlling or regulating with regard to control modules DPM, if the required capacity, in particular with regard to computing power and storage space, is available for this purpose.

The control device, which is already present and used as central control device MSG, may be optionally expanded by adding one or more simple connections, in particular single-wire bus interfaces, if they are not present already. Control modules DPM may be connected to master control device MSG over lines 100 through 105 via these single wire bus interfaces.

In the example presented here, modules DPM12, DPM22 and DPM33 may be used to control or regulate a lock system for the vehicle doors and for adjusting the outside mirrors. The areas are labeled according to their installation sites, where FT denotes the driver's door side and BFT denotes the passenger door side, HL denotes rear left, HR denotes rear right, with or without doors. According to these installation sites, the overall modules are labeled as DPMFT composed of two control modules DPM11 and DPM12, DPMBFT composed of DPM11 and DPM22, DPMHL and DPMHR each composed of a control module DPM33.

The DPMs themselves may each be composed of an electronic module part M and a flexible extension F which is connectable to it via a, for example, uniform interface, the flexible extension being referred to hereinafter also as a film extension. The control modules may be thus composed of an electronic unit M, namely M1, M2 or M3 here and the respective flexible extension F, namely F1, F2 or F3 here, which thus also yields the notation DPM11, ... 12, ... 22, ... 33.

Modules DPM11 may be used, for example, for automatic adjustment and/or heating of an outside mirror, and modules DPM12, DPM22, DPM33 may be the variant-determining part of an automatic lock system. If master control device MSG is connected to a CAN bus as an automotive communication system FKS, e.g., a CAN gateway, in particular a cost-intensive CAN control device for the control modules for connection to automotive bus FKS may thus be omitted in electronic units M1 through M3, hereinafter also referred to as modules.

Control modules DPM may be connected to central control unit MSG via the connections or interfaces 100 through 105. Due to the fact that the central control device contains and makes available an operating system and sophisticated control software in the form of complex algorithms as well as a gateway, control modules DPM, in particular electronic units M1 through M3 contained therein, may have a very simple structure or electronic design. They may be used to convert the information supplied to them into control signals or actuating signals and optionally convert signal states or sensor signals that have been input and send them back as information to central control device MSG.

Electronic units M1 through M3 and/or control modules DPM11 through DPM33 may be located in such a way that the actuators to be controlled by the modules and/or the attached sensors may be connected directly via routes that are as short as possible. In addition to being a film extension, i.e., flex film, this connection as a flexible extension may also be accomplished through discrete lines or directly, e.g., by plug connection to electronic units M1 through M3.

Figure 2A:
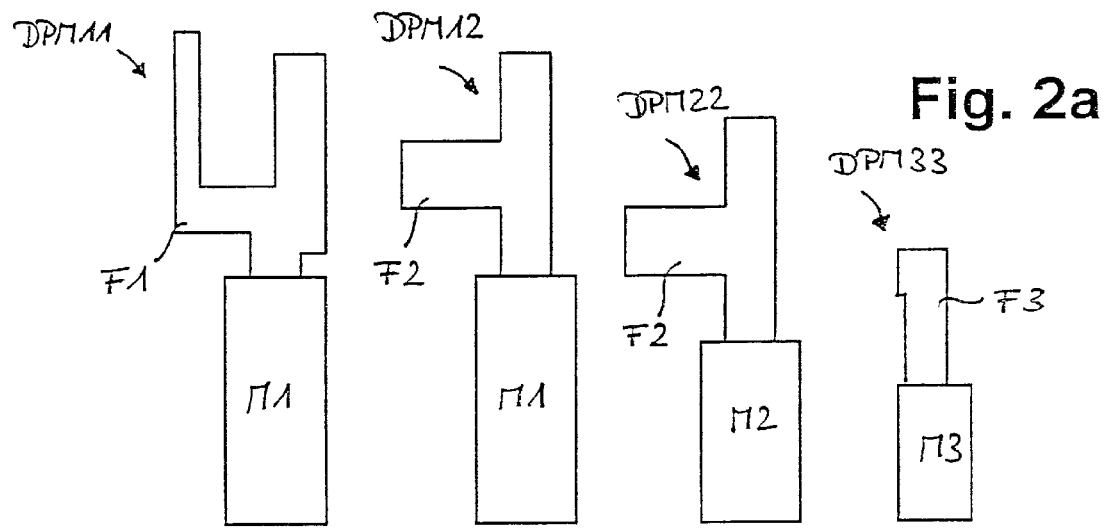
FIGS. 2a and 2b illustrate schematically the design of the control modules and the modular concept used as a refinement of the present invention.
Figure 2B:
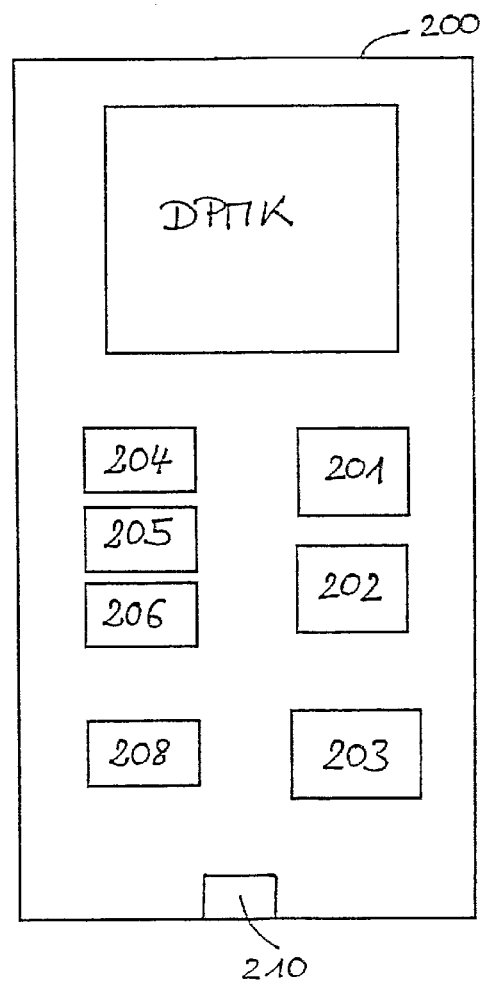

FIG. 2, composed of FIGS. 2a and 2b, shows in FIG. 2a various control module embodiments composed of electronic unit M1 through M3 and film extension F1 through F3, and FIG. 2b shows as an example an electronic unit M. The exemplary modular system, also indicated by the notation in FIG. 1, is also illustrated here. FIG. 2a shows various designs of control modules DPM. In the notation, a combination of an electronic unit M1 with a film extension F1 is labeled as DPM11. Thus, an electronic unit M1 having a film extension F2 is labeled as DPM12, etc.

To reduce the number of variants and thus reduce costs, such a modular principle may be used. The film extensions here may be selected according to the modular principle from a predetermined number or they may be specially designed and manufactured according to the given application case. Specifically, electronic units M1 through M3 are provided in a limited number, i.e., with certain component variants, making it possible to further reduce complexity. In our example, three variants of electronic units M1 through M3 having different components are used.

FIG. 2b shows the basic design of a DPM electronic unit M, labeled as 200. It contains DPM core DPMK which is composed of a hardwired logic or a small control device, the DPMK which is designed in particular as a control device likewise also having a very simple design. The DPM core may be responsible for signal processing and power supply. It thus may serve interface 210 to central control device MSG and the inputs and outputs of module 200. As mentioned previously, the actual control and regulating processes may be carried out in master control device MSG. However, simple algorithms may also be performed in DPM core DPMK itself.

In addition to the DPMK, electronic unit 200 also contains various components and circuit parts such as inputs 204 through 206, e.g., 20 mA, e.g., an analog interface 208 of 5 V, for example, a low-side switch 201 and a high-side switch 202 and a motor bridge 203. The electronic unit of control modules DPM thus may contain a certain number of inputs and a certain number of outputs, e.g., from/to drivers. Depending on the extent of the electronic unit, namely M1 through M3 here, a different number of inputs and outputs, i.e., component variants may be provided. In this embodiment, the three variants M1 through M3 are differentiated by the difference in components and design. Electronic unit M3 may contain, for example, in addition to DPM core DPMK, an H bridge and a high-side switch to represent the basic functionality as a command interpreter in hardwired logic or as a control device having a very simple design. A first extension stage as electronic unit M2 additionally may include a defined number of H bridges depending on the fixed current categories and a few input stages for detecting analog input signals, for example, or digital input signals, i.e., switch signals. An additional increase in the scope of functionality or additional components then result in electronic unit M1. Thus modules DPM having electronic units may cover all the required functions in a few standard sizes either individually or in combination with one another. In other words, the peripherals to be controlled, i.e, actuators and sensors, i.e., each peripheral module, need not necessarily have its own electronics, but instead the entire scope of functionality may be covered through a suitable choice of the respective DPM. If functionalities are nevertheless absent or unavailable, this may be compensated by applying components to the flexible extension.

Figure 3:
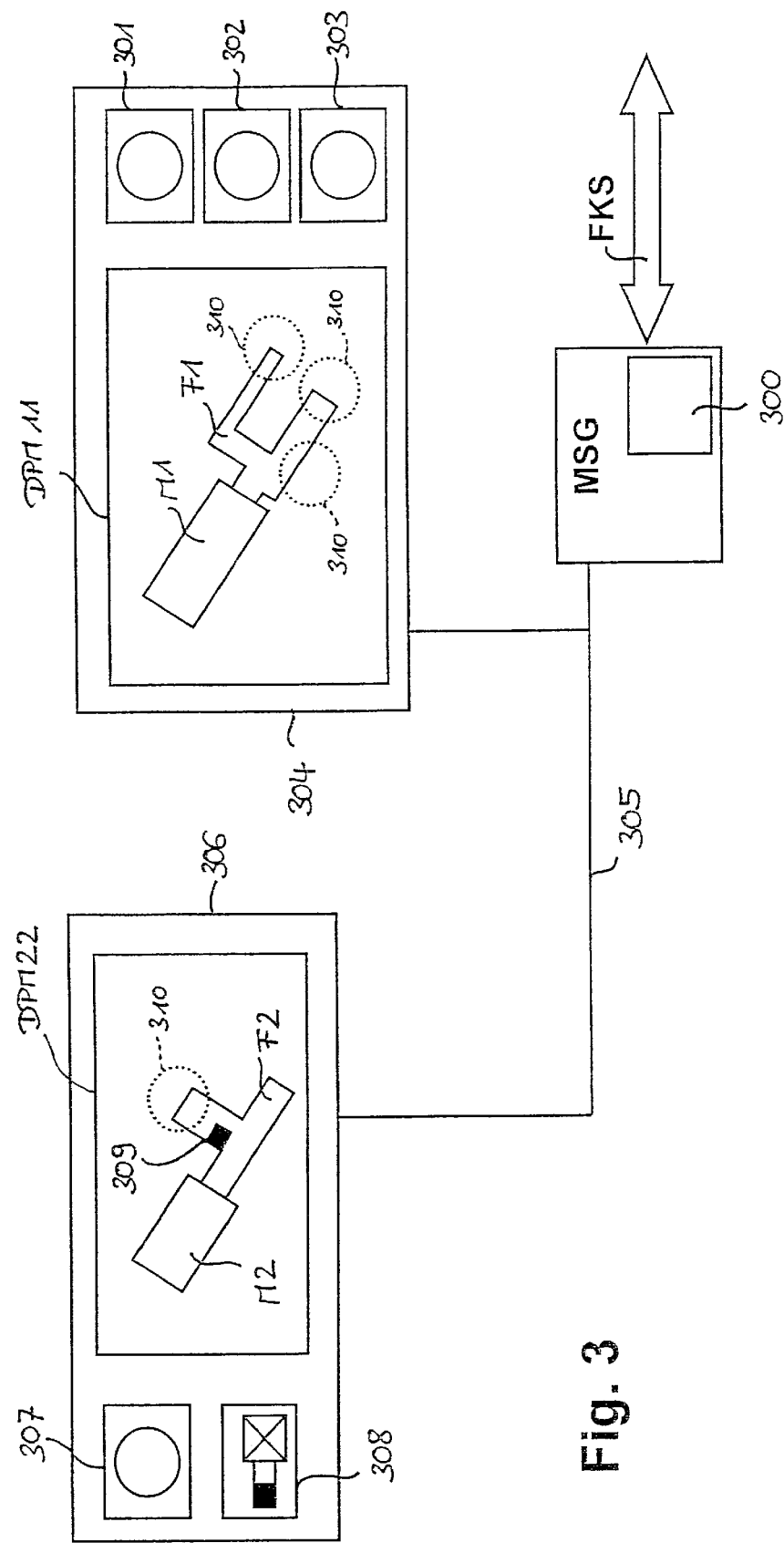
FIG. 3 illustrates a master control device according to the present invention having individual control modules in accordance with FIG. 1, where the master control device provides computing power, an operating system and a gateway for the control modules.

FIG. 3 illustrates the example embodiment of the present invention in somewhat greater detail for an outside mirror adjustment 304 and a lock unit 306, i.e., as the concept for automotive doors, in particular for DPMBFT from FIG. 1. MSG again denotes the central control device, the master control device, which in turn provides the operating system and the algorithms. Control device MSG may in turn be installed as a base control device in particular as a standard control device explicitly for the application, or the additional functionality may be introduced into or programmed into a control device that is already present, e.g., for the electronic comfort controls or a transmission control device.

In addition, central control device MSG may make available the gateway to internal communication system FKS within the vehicle, in particular a CAN bus or a TTP/C bus. Thus, a complicated CAN control device or other complex bus control device may be unnecessary in control modules DPM22 and DPM11. The MSG may be connected to modules DPM22 and DPM11 by a bidirectional link 305. The total scope for the respective functionality, i.e., including actuators and sensors is thus designated as 304 and 306.

The overall module for mirror adjustment is labeled as 304. The actuator for tilting the mirror about the vertical axis is labeled as 301, and the actuator for the adjustment option by tilting about the transverse axis as 302. The actuator for automatic mirror retraction function for driving into the garage or a carwash, for example, is labeled as 303. Actuating motors for 301, 302 and 303 are mounted directly on film extension F1 of module DPM11. Connections of actuator 310, which are also labeled identically here, are provided for this purpose.

The module for a lock unit in the vehicle, e.g., in the front passenger's door, is labeled as 306. Actuator 307 for an electric lock, for example, is connected to electronic unit M2 by connection 310, where actuator 307 is connected directly to conductor film F2 by the flexible extension, i.e., film extension F2 of control module DPM22. The connections of the actuators are also labeled uniformly here and are differentiated more precisely in the following figures. Likewise, a sensor 308, in particular a Hall sensor, is mounted on film extension F2 at 309 to monitor the position of actuator 307 of the electric lock.

As the figure shows, the basic device, i.e., master control device MSG may have a common input/output line 305 over which it is possible to detect on initialization which peripheral unit is connected and is to be operated.

Thus, there is no direct and complex connection of control modules, namely DPM11 and DPM22 here, to automotive bus FKS, in particular a CAN bus. For use for controlling the vehicle door functions, for example, a separate line may thus be provided for each door or for each control module or only for each side of the vehicle. Thus, the DPM modules, i.e., blocks 306 and 304, i.e., the control modules and/or the peripheral elements in general may be installed at optimum locations with regard to advantages in terms of lines saved, cooling options, installation conditions, in particular installation space, etc. In comparison with a normal field bus concept, in particular a CAN bus having a two-wire line, additional line material may be saved due to the single-wire interface, namely 305 here.

Figure 4:
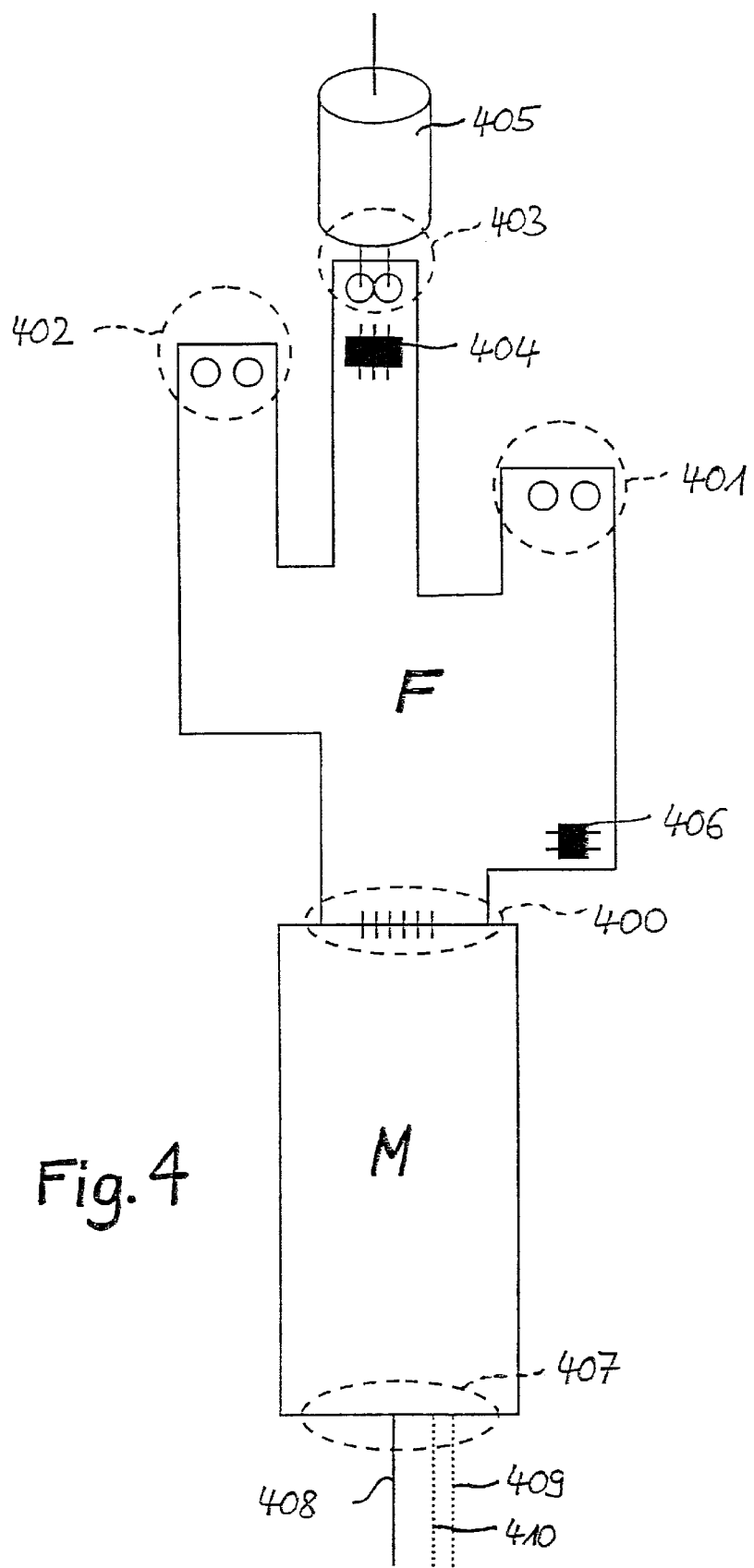
FIG. 4 shows a specific extension of the modules according to the present invention in the form of a conductor film for accommodating components and for connection to peripheral elements, i.e., sensors and actuators.

FIG. 4 shows different options for the design of the film extension. Film extensions F may be designed so that different actuators or sensors may be connected to connection lugs 401, 402 and/or 403 by folding, bending, etc. The terminals then need not be in the same plane as the film. In addition, the film extension may accommodate components such as Hall sensors or temperature sensors 406 at a suitable location, so that contact with the sensing component is optionally established in an ideal manner. Likewise, power output stages 404 may be positioned on the film in such a way that their cooling connection and/or installation space is utilized optimally. An arrangement of power semiconductors 404 in the immediate proximity of actuators 405 by way of connection lug 403 is also possible. Electronic units M (M1 through M3) may thus contain either the high-side and low-side components, or these may be accommodated on the conductor film as indicated at 404, for example. Thus, although the wiring complexity for connecting switch 404 usually increases, long lines carrying high power to the respective actuator may thus be avoided, for example, in view of the electromagnetic compatibility problems. Actuators such as motors, in particular actuator motors 405, may be connected directly to connection lugs 401 through 403 of the film extension. The connection may be established by soldering, welding, crimping or by some other technique. Thus, the desired connection areas, i.e., the film ends or connection lugs 401 through 403, may be connected to the actuators or sensors to be contacted in the three-dimensional space. Bidirectional connection 408 runs through an interface 407 into the electronic unit. Depending on whether the power supply is connected to the control module or to the peripheral element or its proximity, e.g., as a battery or accumulator or is connected to the control module, the required lines, e.g., ground 410 and phase 409 may be present and may be taken into account in interface 407.

The connection between film F and electronic unit M, which is labeled as 400, may be uniform so that different combinations of electronic units M (M1 through M3) and designs of film extension F (F1 through F3) and/or, in the case of a uniform electronic unit M, different film extensions may be used and vice versa.

The flexible extensions of the control modules, also referred to as film extensions, may be designed as conductor films or flex films. Printed conductors or conducting structures for power and/or signal transmission to and/or from the peripheral elements may be surrounded by a nonconducting flexible material, in particular a moldable material such as a plastic or a plastic film, the printed conductors and/or structures optionally also may be merely applied. When using a polymer sheathing, in addition to the flexible placement of the control modules and/or peripheral elements, it may be made possible to largely rule out problems such as unfavorable ambient influences on the conductor structures, i.e., the signal line and/or power line. The effect of moisture or wetness for example may also be ruled out as well as that of soiling, for example. The polymers may be selected so that deformation of the film extension for contacting the peripheral elements remains, i.e., the flexible extension has a memory, so to speak. However, this may also be achieved by the enclosed printed conductors or additional enclosed supporting and deforming paths.

In addition, the conductor structures and/or the flexible extension may also be shielded additionally against electromagnetic radiation in view of the problems of electromagnetic compatibility and/or the emission of its own interfering radiation by the control module or the flexible extension and/or components placed thereon, in particular through the line structures may be suppressed or prevented. This may be accomplished by an additional layer of conductive polymer applied or by vapor deposition of a metal substrate and grounding, for example.

In addition to standardized film extensions according to the modular principle of electronic units, however, specially designed film extensions having any desired shape may also be connected to electronic units M.

Figure 5A:
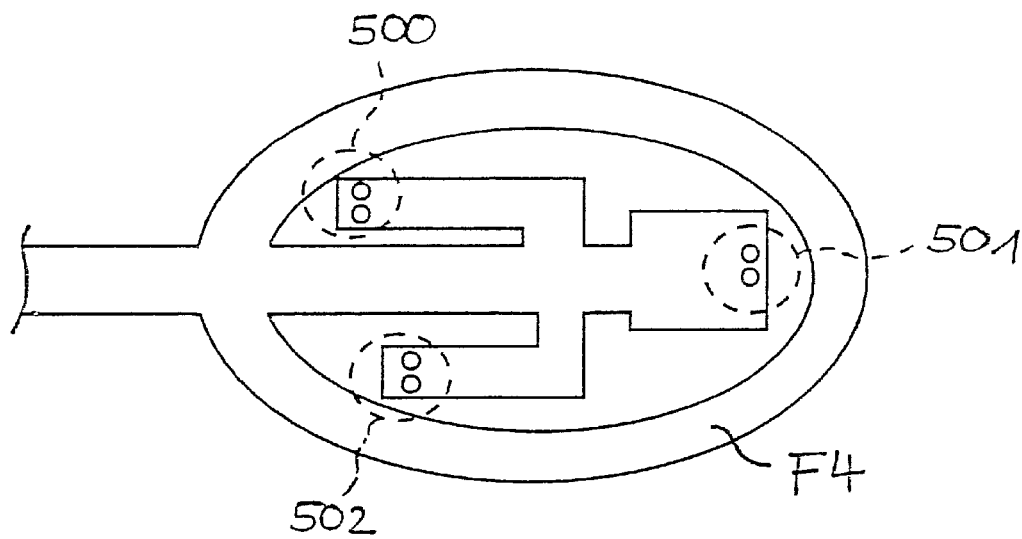
FIGS. 5a and 5b show a specific application of an example embodiment according to the present invention, using a flexible extension for the transition between a wet space and a dry space.
Figure 5B:
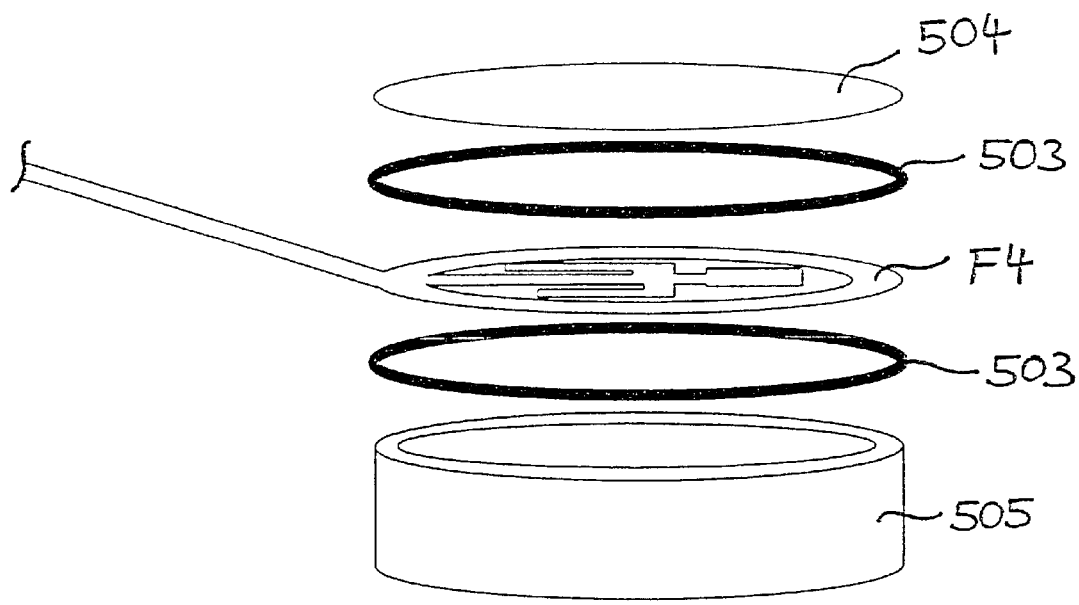

A exemplary embodiment is illustrated in FIG. 5, which is composed of FIGS. 5a and 5b. A film extension F4 may be designed in the form of a ring in its outside dimensions and may be equipped with connections 500 through 502 through special shaping. Due to this special shaping of the film extension, it may be passed through a seal so that it lies flatly on the site to sealed, for example.

A seal may be formed by a gasket 503 on both sides of the film extension, for example, as illustrated in FIG. 5b. Actuators or sensors in a dry space 505 are to be connected in a surrounding wet space. Due to the special ring-shaped design of film F4 corresponding to the exemplary form of the seal to dry space 505, the dry space and thus connections 500 through 502 may be sealed tightly by a cover F5 against the wet space by using one gasket 503 on each side of film extension F4. Film extension F4 may itself function as a gasket in another embodiment by a thickening of the edge or a specially introduced gasket.

Figure 6:
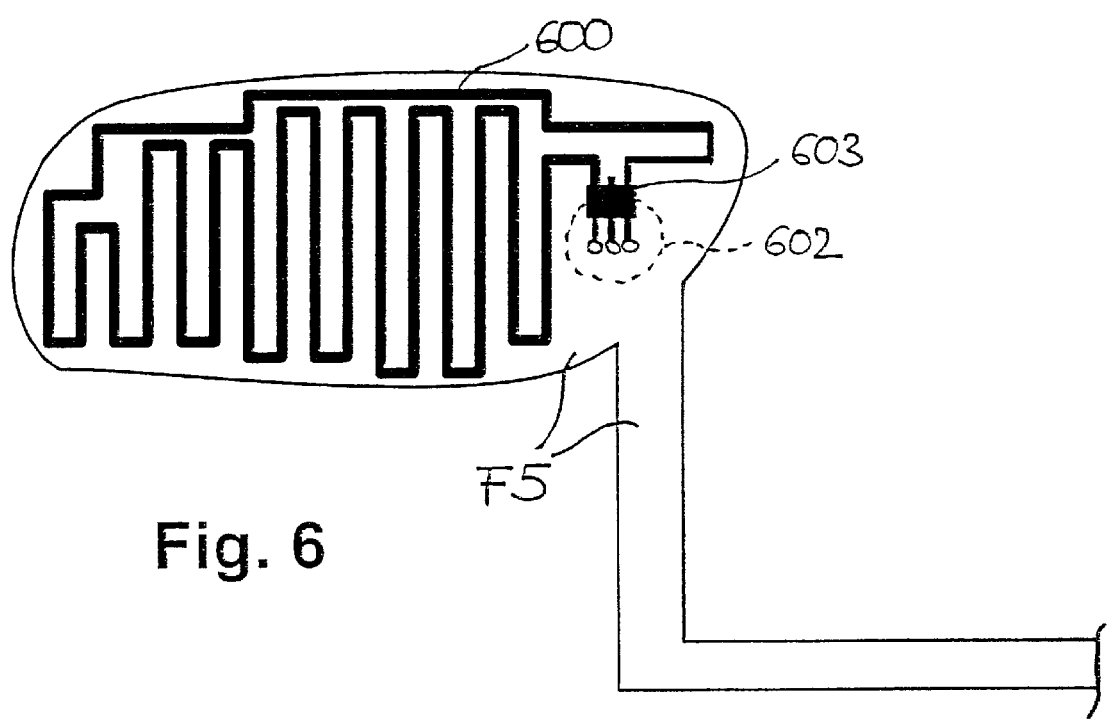
FIG. 6 shows another specific application of the module concept using a flexible extension for heating a mirror or windshield.

One embodiment of the enormous number of different possible applications of the present invention, in particular for use with a film extension, FIG. 6 illustrates the heating of a mirror or a windshield. For example, a heating mat in the form of a shaped heating wire 600 may be applied to a mirror, for example. This heating mat may be designed together with a plastic film as film extension F5, so that connection 602 for the power driver of mirror heating 603 may be accommodated directly in the mirror space. Therefore, the power loss of power driver 603 may also be used for heating the mirror. In the case of laminated safety glass, for example, heating mat 600 may be introduced into the film of the laminated safety glass to advantage. Heating wire 600 may be thus integrated together with the film as film extension F5 into the laminated safety glass as a film thereof, the connection of film extension F5 leading out of the glass. Power driver 603 may also sit directly on the glass or in the case of a mirror using this laminated safety glass method it may sit on the mirror glass itself. Then almost 100% of the power loss of the driver may be used to heat the mirror or the glass, i.e., virtually without any power loss.

The same or comparable methods may also be used for heating the seat, the window lifts, door locks, windshield heating, windshield wipers, motors, i.e., various actuating motors or lamps and other actuators or sensors.

Figure 7A:
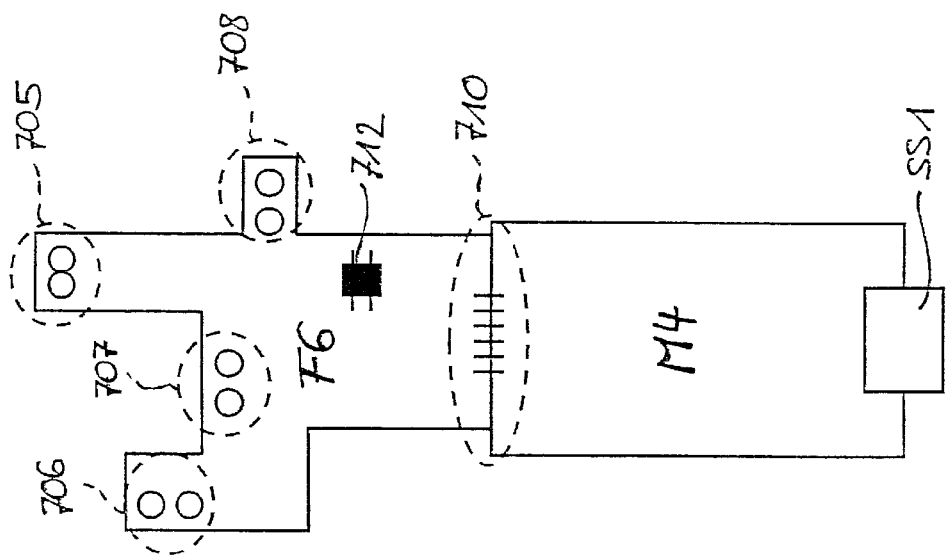
FIGS. 7a and 7b show two ways of connecting the control modules to the bidirectional interface to the master control unit.
Figure 7B:
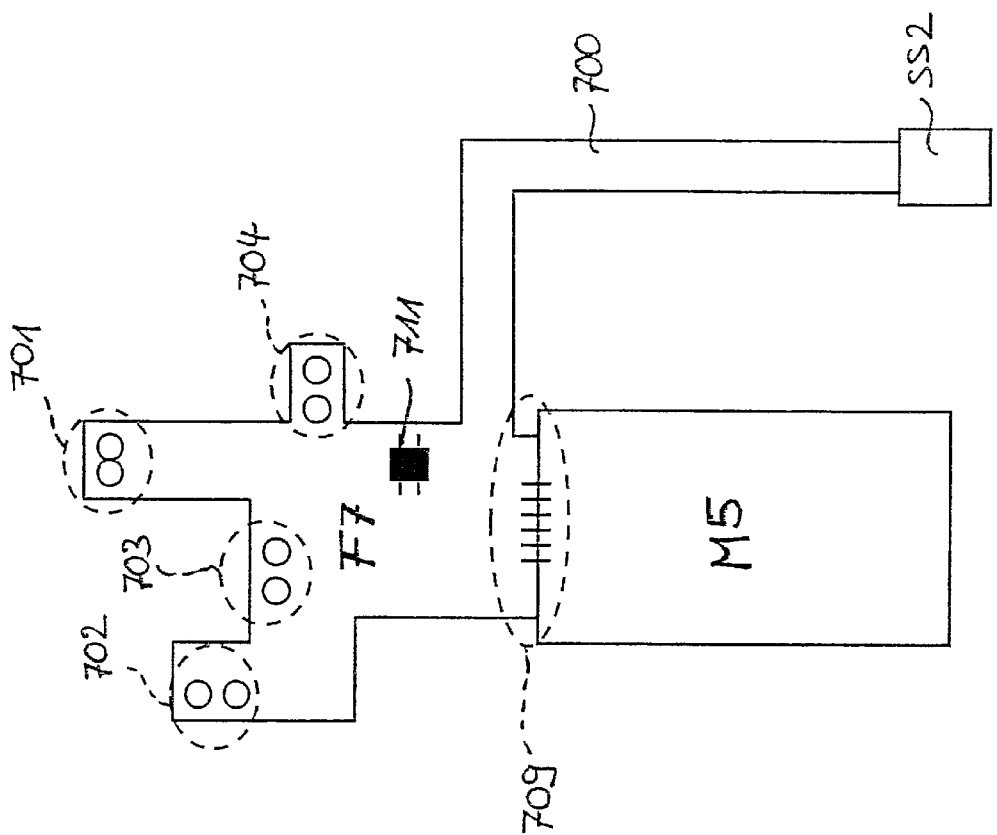

Finally in FIG. 7, which is made of up FIGS. 7a and 7b, two possible connections of electronic units over the single-wire bus interface to master control device MSG are also shown. An electronic unit M4 having a film extension F6 contains interface SS1 integrated into electronic unit M4 for connection to the single-wire bus leading to the central control device. The connections of this film extension F6 are labeled as 705 through 708. The standard interface is labeled as 710 and a generic component is labeled as 712.

Another possibility illustrated in FIG. 7b is to provide film extension F7 to electronic unit M5 with a contact lug 700 to which interface SS2 is connected for connection to the single-wire bus leading to the central control device. These connections are labeled here as 701 through 704, the uniform interface is labeled as 709, and a component is labeled as 711.

What is claimed is:

1. A control module for implementing control or regulating functions in a motor vehicle, comprising:
    an electronic unit; and
    a flexible extension configured to contact a peripheral element, a predefined uniform interface being used between and coupling the electronic unit and the flexible extension, the predefined uniform interface being configured to support combinations of different electronic unit with different flexible extensions;
    wherein the control module is configured to be connected between a control unit and the peripheral element, the control unit implementing control or regulating functions as a function of at least one of a triggering and an analysis of signals of the peripheral element.

2. The control module according to claim 1, wherein the flexible extension is designed as a deformable film extension.

3. The control module according to claim 2, wherein the flexible extension is designed as a conductor film.

4. The control module according to claim 1, further comprising:
    a plurality of electronic components mounted on the flexible extension and configured to at least one of trigger and analyze the signals.

5. The control module according to claim 1, wherein the flexible extension is configured to have the peripheral element installed directly thereon.

6. The control module according to claim 5, wherein the peripheral element is a sensor.

7. The control module according to claim 1, wherein the electronic unit is scalable.

8. The control module according to claim 7, further comprising:
    at least one additional electronic unit mounted on the flexible extension to provide a missing function of the electronic unit.

9. The control module according to claim 7, further comprising:
    at least on additional control module mounted on the flexible extension to provide a missing function of the electronic unit.

10. A device for implementing control or regulating functions in a motor vehicle, comprising:
    a peripheral element;
    a control unit coupled to the peripheral element, the control unit configured to control or regulate functions as a function of at least one of a triggering and analysis of signals of the peripheral element;
    a control module disposed between the control unit and the peripheral element, the control module including an electronic unit and a flexible extension, the peripheral element being contacted by the flexible extension, wherein a predefined uniform interface is used between the electronic unit and the flexible extension, the predefined uniform interface configured to support combinations of different electronic units with different flexible extensions.

11. The device according to claim 10, wherein the peripheral element is configured to control or regulate second functions, the second functions being implemented independently of the functions controlled or regulated by the control unit at least one of programs and data for the second functions being fed into the control unit, the control module being designed to supplement at least one of electronic components and function necessary of implementing the second functions and are missing or not available in at least one of the control unit and the peripheral element.

12. The device according to claim 10, further comprising:
    an interface unit, the control unit connected to a communication system in the vehicle by the interface unit, the control module being connected to the control unit by a bidirectional connection existing in addition to the communication system, the control module using the interface unit of the control unit for access of the control module to the communication system.

13. The device according to claim 12, wherein the communication system is a two-wire bus system.

14. The device according to claim 12, wherein the bidirectional connection is a single-wire bus connection.

* * * * *

UNITED STATES PATENT AND TRADEMARK OFFICE
CERTIFICATE OF CORRECTION

PATENT NO. : 6,754,565 B2
DATED : June 22, 2004
INVENTOR(S) : Michael Horbelt et al.

It is certified that error appears in the above-identified patent and that said Letters Patent is hereby corrected as shown below:

Column 8,
Line 27, change "A exemplary embodiment" to -- An exemplary embodiment --.

Column 10,
Line 8, change "at least on additional" to -- at least one additional --.

Signed and Sealed this

Eighteenth Day of October, 2005

JON W. DUDAS
*Director of the United States Patent and Trademark Office*